United States Patent [19]

Fevre et al.

[11] Patent Number: 5,758,545
[45] Date of Patent: Jun. 2, 1998

[54] DEPTH-ADJUSTABLE STEERING COLUMN WITH GUIDING DEVICE

[75] Inventors: Laurent Fevre, Saint-Sulpice; Jean-Christophe Bodin, Saint-Ouen, both of France

[73] Assignee: Lemforder Nacam S.A., Vendome, France

[21] Appl. No.: 686,671

[22] Filed: Jul. 26, 1996

[30] Foreign Application Priority Data

Jul. 26, 1995 [FR] France ................... 95 09110

[51] Int. Cl.⁶ .................................................. B62D 1/18
[52] U.S. Cl. ................ 74/493; 280/775; 384/42; 403/109; 403/365; 403/372; 403/377
[58] Field of Search ............... 74/492, 493; 280/775; 384/42; 403/109, 365, 366, 367, 372, 377

[56] References Cited

U.S. PATENT DOCUMENTS

| | | | |
|---|---|---|---|
| 2,362,566 | 11/1944 | Lappert | 384/273 X |
| 3,515,417 | 6/1970 | Bowman | 403/366 |
| 3,665,777 | 5/1972 | Jensen | 74/492 |
| 3,936,015 | 2/1976 | Dean | 74/493 X |
| 4,636,106 | 1/1987 | Waisbrod | 403/372 X |
| 4,667,530 | 5/1987 | Mettler et al. | 74/493 |
| 5,086,661 | 2/1992 | Hancock | 74/493 |
| 5,383,811 | 1/1995 | Campberll et al. | 74/493 X |
| 5,590,565 | 1/1997 | Palfenier et al. | 74/493 |

FOREIGN PATENT DOCUMENTS

| | | |
|---|---|---|
| 0 315 823 | 5/1989 | European Pat. Off. |
| 33 39 926 | 5/1985 | Germany. |
| 3924015 | 11/1989 | Germany ................. 74/492 |

*Primary Examiner*—Allan D. Herrmann
*Attorney, Agent, or Firm*—Young & Thompson

[57] ABSTRACT

A depth-adjustable steering column for a motor vehicle whose shaft is disposed in a tube body including two tubes (2, 3), one sliding in the other, a sheath (5) being disposed between the two tubes (2, 3). The sheath (5) comprises projecting elements which are flexible in a radial direction and come into contact with at least one of the tubes (2, 3). The projecting elements are orientated longitudinally, namely parallel to the axis of the tubes (2, 3).

26 Claims, 5 Drawing Sheets

DEPTH-ADJUSTABLE STEERING COLUMN WITH GUIDING DEVICE

FIELD OF THE INVENTION

The present invention forms part of the technical field of equipments for motor vehicles and relates more specifically to a depth-adjustable steering column.

BACKGROUND OF THE INVENTION

The improvement in services offered by manufacturers is bringing about a development, not only as regard the technical performances of vehicles, but also as to the comfort of passengers and more specifically of the driver. The development of the driver seat unit concept is making it possible to adapt the geometry of the passenger compartment to the morphology of the driver, and thus to improve the ergonomics of this driver seat unit in which the steering wheel has an important place. The adjustment system of the steering wheel position is then generally mounted on the steering column.

One of the difficulties confronted at the time of embodying a depth-adjustment system of a steering column resides in the search for a compromise between the sliding force, which needs to be low, and the backlash of the system, which must be as reduced as possible, so as to be insensitive to the level of the steering wheel. This compromise generally results in steering column manufacturers producing a guiding system using techniques which allow precise adjustments to be made between the moving elements. But known technical solutions are generally costly.

With a depth-adjustable steering column in which the column shaft is disposed in a tube body, the latter takes part in guiding the movement. The tube body may be made up of a single element and in this case the length of the projecting end of the shaft portion to which the steering wheel is secured, varies according to the adjustment position.

The tube body may also be composed of two tubular elements with one sliding into the other, as described in the patent FR-2.662.986 of the applicant. In this embodiment, the moving elements of the tube body are produced with adjustments adapted to reach a compromise between the sliding force and the play of the adjustment system.

The document EP-0.315.823 also describes a depth-adjustable steering column for a motor vehicle, in which the tube body includes two tubes with one sliding into the other. In this column, a sheath is disposed between the two tubes so as to keep their relative position and stiffen their assembly.

However, it is desirable to further improve existing systems and in particular to reduce the price thereof, with equal performances.

The document DE-A-33.39.926 describes a safety steering column including respectively external and internal axial portions with non-circular cross-sections, connected telescopically. An elastic element with undulated surfaces is inserted between the two portions. The elastic element includes two flanks positioned at a right angle, partially encompassing the internal portion, and a flexible projecting element onto one of the two flanks and engaged in an opening of the external portion so as to keep the elastic element in position. The presence of the elastic element makes it possible to eliminate the play between the portions and to predetermine the axial force needed to provoke a telescopic movement of the two portions should an impact occur.

The document U.S. Pat. No. 3,665,777 describes a steering column assembly including an outer energy absorption sleeve and a steering shaft adapted to be telescopically folded inside the outer sleeve. Elastic friction elements are disposed in grooves made in the internal shaft. They prevent audible vibrations occurring between the telescopic components.

OBJECTS OF THE INVENTION

The object of the invention is a depth-adjustable steering column whose design allows for greater dimensional tolerance of the moving elements, facilitates mounting and production and thereby makes it possible to reduce costs.

Another object of the invention is to improve the user's comfort and to permit depth-adjustment of the steering column with a slight force, without any sensation of play.

SUMMARY OF THE INVENTION

The invention is applicable to a depth-adjustable steering column, for a motor vehicle, whose shaft is disposed in a tube body including two tubes with one sliding into the other, a sheath being disposed between the two tubes.

According to the invention, the sheath comprises projecting elements which are flexible in a radial direction and come into contact with at least one of the tubes, the projecting elements being orientated longitudinally, namely substantially parallel to the axis of the tubes.

The projecting elements make it possible to firstly dampen the radial play between the two tubes of the tube body and thus avoid the sensations of play at the level of the steering wheel, and secondly reduce the surfaces in contact between the two tubes and thus limit the forces required for the relative movement between the two tubes at the time the depth of the steering column is adjusted. The sheath therefore directly assists in improving user comfort.

In various particular embodiments, the invention comprises the following characteristics, taken either separately or according to their technically possible combinations:

- the sheath comprises projecting elements coming into contact with the two tubes;
- the sheath comprises a block intended to be engaged in an opening provided on one of the tubes so as to keep the sheath in position,
- at one of its extremities, the sheath includes a flange abutting against the outer tube when it is placed,
- the sheath is made of plastics and in particular of a thermoplastic material,
- an antifriction material is added to the material forming the sheath or inserted between the sheath and the tubes, at least close to the projecting elements,
- the projecting elements are flexible tongues,
- the sheath includes two sets of flexible tongues, disposed respectively close to the extremities of the sheath,
- each tongue includes a branch slanted with respect to the steering column axis and whose free extremity comes into contact with one of the two tubes,
- the slanted branch of a tongue forms together with the steering column axis an angle of between 5° and 45° and preferably substantially equal to 15°,
- the sheath comprises a core from which each tongue extends, each tongue including two branches, one extremity of the first branch being connected to the core of the sheath and the other extremity being connected to one extremity of the second branch, the other

3 extremity of the second branch being free, said first and second branches being disposed so as to form an open V whose apex comes into contact with one of the tubes, the free extremity of the second branch coming into contact with the other tube, the tube is slit in the longitudinal direction, the projecting elements, orientated longitudinally, are embodied by providing the sheath with a generally undulated or ridged section, the zones situated at the tops of the undulations or ridges entering into contact with the tubes of the tube body, thus ensuring substantially linear contact surfaces disposed parallel to the axis of the tubes, whereas the linking zones between the top zones are adapted to be deformed, producing a radial flexibility.

BRIEF DESCRIPTION OF THE DRAWINGS

Various characteristics and advantages of the invention shall appear more readily from a reading of the following non-restrictive description, given by way of example, with reference to the accompanying drawings on which:

FIGS. 4A, 4B and 4C illustrate the successive steps for placing the sheath between the two tubes, FIG. 4A being an axial section of solely the sheath along the plane IVA—IVA of FIG. 2, and FIG. 4C being an axial section of the sheath occupying its final position between the two tubes of the tube body, along the plane IVC—IVC of FIG. 3, whereas

DETAILED DESCRIPTION OF THE INVENTION

Figure 1:
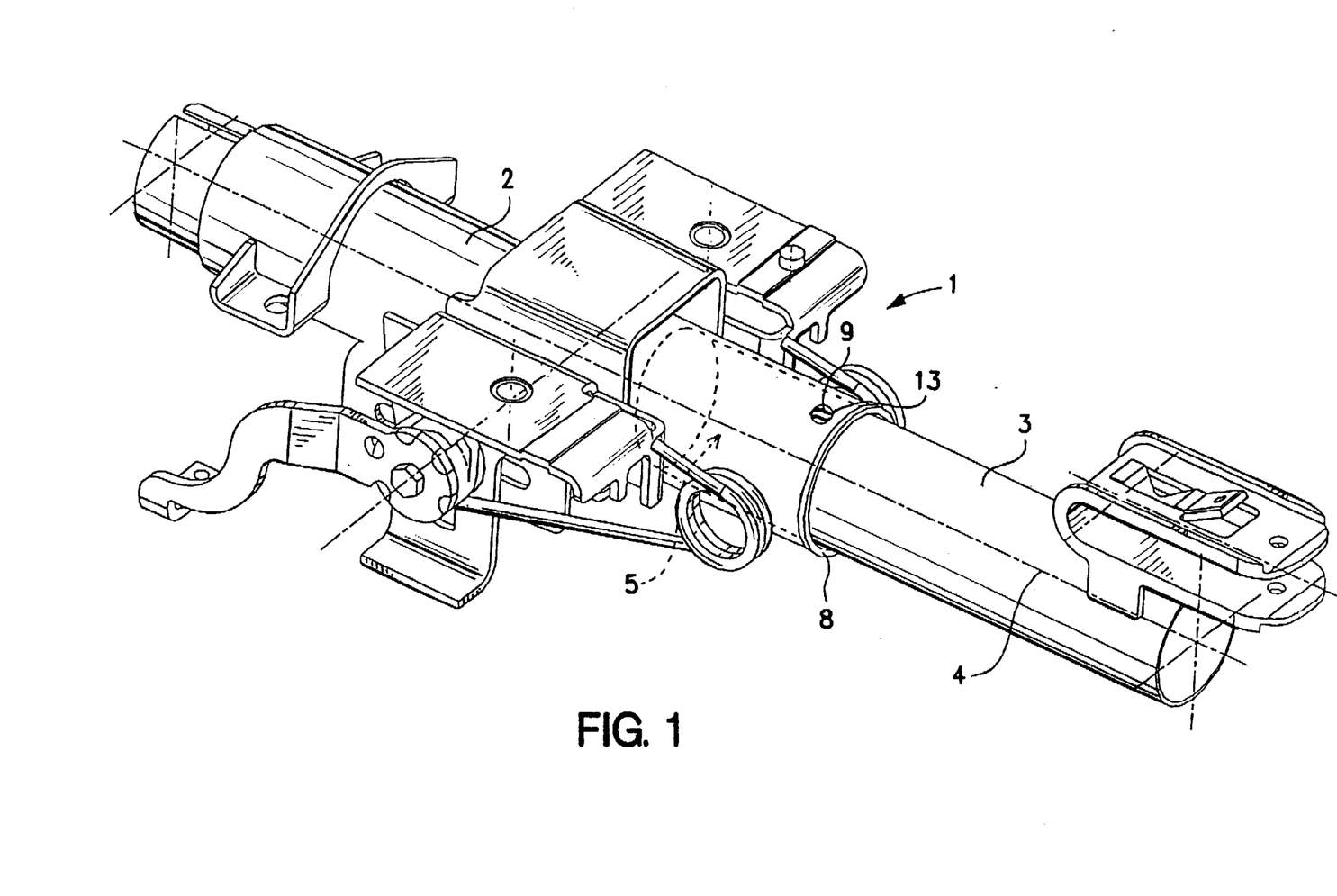
FIG. 1 is a perspective view showing a steering column tube body to which the invention can be applied.
Figure 3:
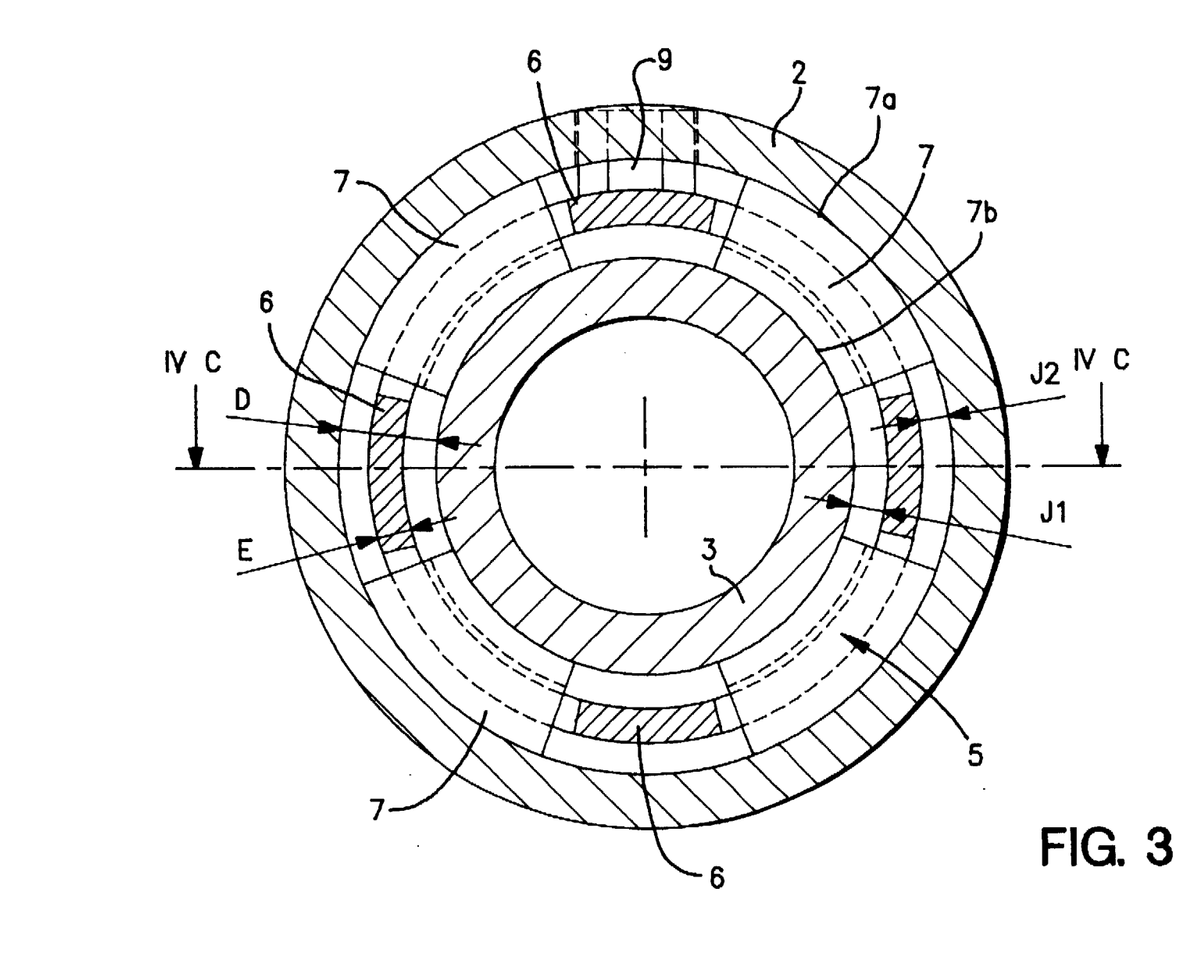
FIG. 3 shows a cross section along the plane III—III of FIG. 4C, made at the extremities of one of the sets of tongues, of a sheath being placed between the two tubes of the tube body.
Figure 7:
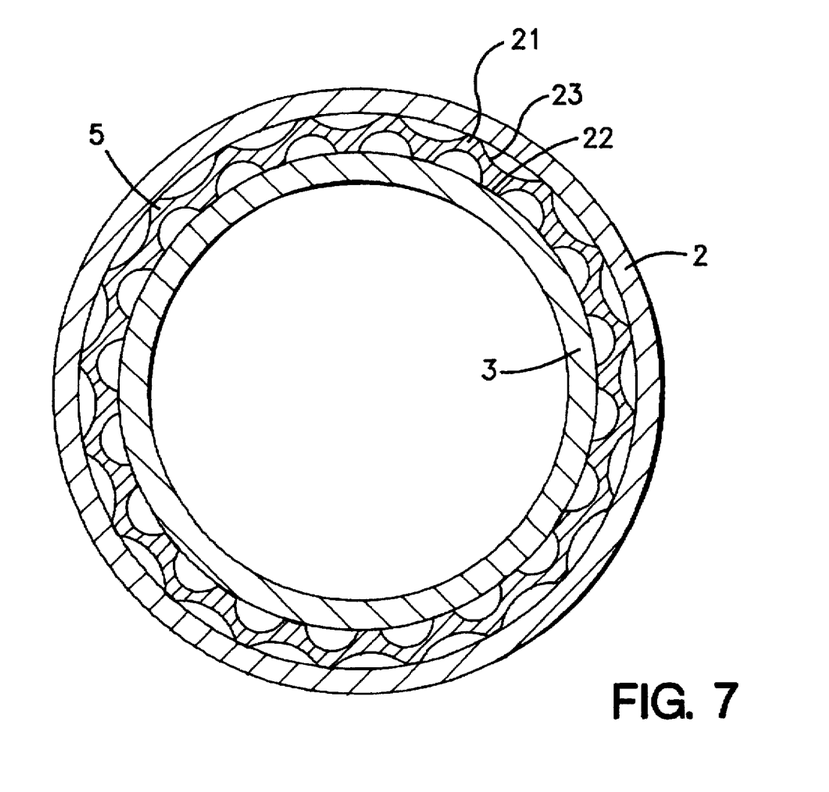
FIG. 7, similar to FIG. 3, represents a cross section of the sheath according to FIG. 6 and placed between the two tubes of the tube body.

As can be seen in FIGS. 1 and 3 or 7, the steering column tube body 1 includes two tubes 2 and 3, with one sliding into the other along the axis 4 of the column. A sheath 5 (diagrammatically shown by the dots in FIG. 1) is disposed between the outer tube 2 and the inner tube 3. A block 9 formed on the sheath 5 is introduced into an opening 13 provided in the tube 2 so as to keep the sheath in position.

Figure 2:
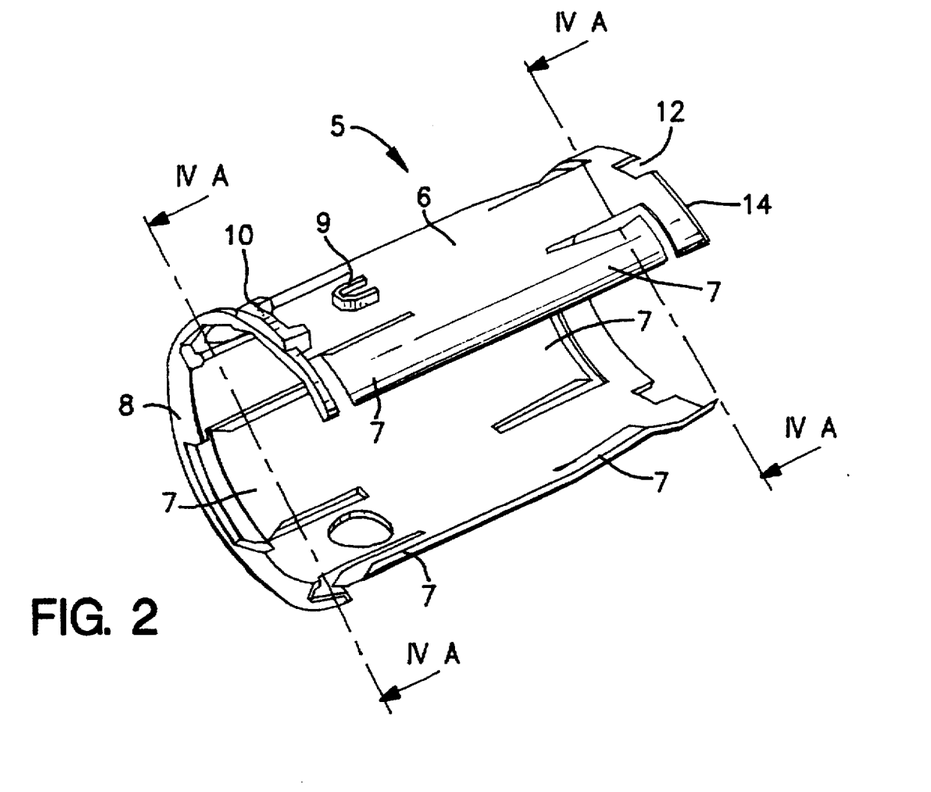
FIG. 2 is a partially cutaway perspective view of an embodiment of a sheath to be disposed between the two tubes of the tube body.

A first embodiment of the sheath 5 is shown in FIG. 2. It constitutes a generally cylindrical monobloc unit with a section corresponding substantially to that of the tubes 2 and 3.

The sheath 5 includes, at one of its extremities, a flange 8 abutting against the outer tube 2 at the time it is placed, thus facilitating the introduction and extraction of the sheath 5.

4

Also provided against this flange 8 is a projection 10 intended to facilitate the orientation of the element at the time it is mounted.

The other extremity of the sheath 5 is bevelled so as to constitute a ramp 14 facilitating introduction of the sheath into the outer tube 2.

Also formed on this extremity are two recesses 12 intended to facilitate orientation of the element at the time it is mounted.

FIG. 2 also shows the block 9 formed on the core 6 of the sheath 5 and intended to be inserted on mounting in the opening 13 of the outer tube 2.

According to the invention, the sheath 5 includes projecting elements coming into contact with at least one of the tubes. The projecting elements are flexible tongues 7 formed at each of the extremities of the sheath 5. In this embodiment, the tongues 7 are disposed symmetrically, that is by pairs at each extremity of the sheath 5. They are evenly distributed around the sheath 5, FIGS. 2 and 3 showing two sets of four tongues 7 provided at each extremity.

FIG. 3 shows the space D provided between the outer diameter of the inner tube 3 and the internal diameter of the outer tube 2. The sheath 5 is inserted in this space D.

The thickness E of the sheath 5, adapted to be assimilated with the thickness of its core 6, does not entirely fill the space D. Thus, a play J1 exists between the sheath 5 and the inner tube 3, and a play J2 exists between the sheath 5 and the outer tube 2. Each of these plays J1 and J2 is determined so as to absorb the dimensional variations resulting from the production of the sheath 5 and the tubes 2, 3.

Each of the tongues 7 has a portion slanted with respect to the steering column axis 4 and shaped so as to provide a surface 7a in contact with the outer tube 2 and a surface 7b in contact with the inner tube 3.

These contact surfaces 7a and 7b are continuous. In the embodiment shown in FIG. 3, the tubes 2, 3 are cylindrical and the contact surfaces 7a, 7b correspond to curved surfaces.

The surfaces in contact are thus sufficiently large so as to avoid any premature wear of the tongues. However, they remain relatively small and in any event are clearly smaller than the confronting surface of the two tubes 2 and 3.

More particularly, as shown in FIGS. 4A, 4B, 4C and 5, the sheath 5 includes a set of front tongues 15 fitted on the side of the bevel or ramp 14 and a set of rear tongues 18 fitted towards the extremity of the sheath 5 having the flange 8.

Each tongue 15, 18 comprises two branches 16, 17 and 19, 20 respectively, forming an open V whose internal angle A2 is, for example, between 135° and 175°.

At one of its extremities, the first branch 16, 19 extends from the core of the sheath 5 and its other extremity is connected to the second branch 17, 20. The second branch 17, 20 is thus connected at one extremity 17b, 20b to the first branch 16, 19. This extremity 17b, 20b corresponds to the apex of the V formed by the two branches 16, 17 and 19, 20. The other extremity 17a, 20a of the second branch 17, 20 is free, that is not linked to the body of the sheath 5, thus procuring a flexibility in a radial direction.

The first branch 16, 19 advantageously has a substantially constant thickness equal to the thickness of the core 6 of the sheath 5 or less than this thickness, for example by a half. The thickness of the second branch 17, 20 decreases towards its free extremity 17a, 20a.

The free branch 17, 20 is substantially shorter than the branch 16, 19 attached to the body 6 of the sheath 5.

In one concrete embodiment, the first branch 16, 19 is substantially aligned with the body of the sheath 5. The free branch 17, 20 forms an angle A1 with the axis 4 common to the sheath 5 and the column. The angle A1 is advantageously between 5° and 45° and preferably is equal to about 15°.

Figure 4A:
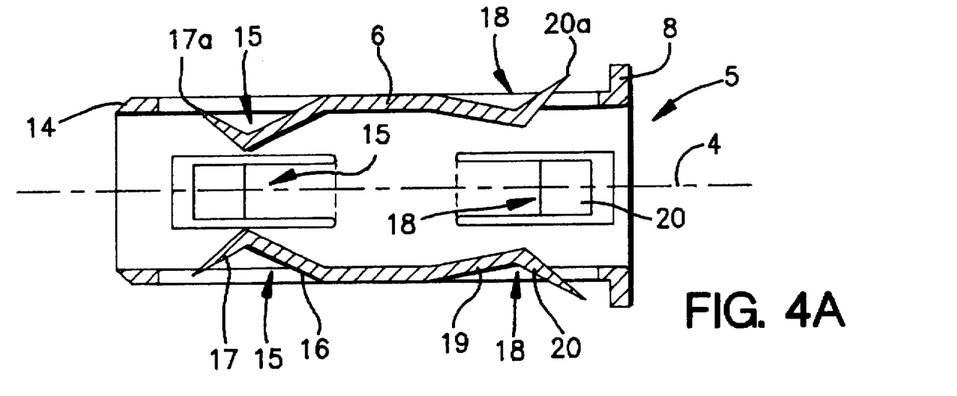

As shown in FIGS. 4A and 2, the free extremities 17a, 20a, at rest and without any stress exerted, define circles with different diameters. The free extremities 17a of the front tongues 15 are situated on a circle having a diameter smaller than the outer diameter of the core 6 of the sheath 5. In this way, the free extremity 17a of the front tongues 15 is hidden, at the time of introduction into the tubes, by the front portion of the sheath 5 comprising the slanted ramp 14.

The free extremities 20a of the rear tongues 18 are situated on a circle having a diameter larger than the outer diameter of the core 6 of the sheath 5.

Figure 4B:
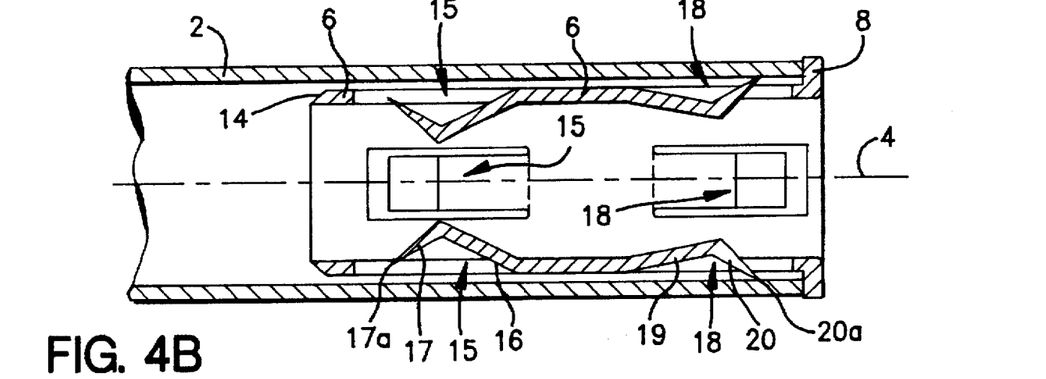
FIG. 4B is a similar section illustrating an intermediate position of the sheath.

As shown in FIG. 4B, the sheath 5 is introduced into the outer tube 2 by firstly presenting the bevelled face 14. The front tongues 15 are then hidden behind this bevel, which makes it possible to prevent the tongues from being hooked and damaged.

During introduction, the tube 2 biases the free extremity 20a of the rear tongues 18 by pushing them towards the inside of the sheath 5. The tube 2 finally comes into abutment with the flange 8 and the block 9 is engaged in the opening 13 of the outer tube 2.

Figure 4C:
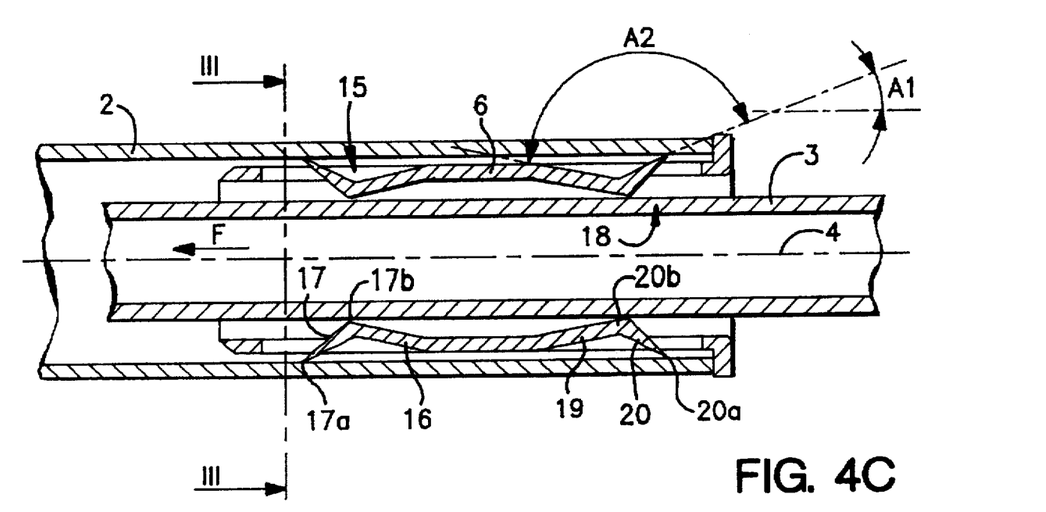

In the step shown in FIG. 4C, the inner tube 3 is introduced into the sheath 5 in the direction of the arrow F. It firstly comes into contact with the branch 20 of the rear tongues 18. The slanted disposition of these branches 20 makes it possible to constitute a ramp facilitating introduction of the tube 3.

When further introduced, the tube 3 then comes into contact with the branches 16 integral with the core 6 of the sheath 5. The slightly slanted disposition of these branches 16 also constitutes a guiding ramp facilitating the introduction of the inner tube 3.

The tube 3 radially pushes the tongues 15, 18 outwardly. These tongues 15, 18 are then compressed or pre-stressed. Their V-shaped form enables them to be in contact with both the inner tube 3 and the outer tube 2; respectively via the lower apex 17b, 20b of the V and the edge of the free extremity 17a, 20a. As the dimensions of the core 6 of the sheath 5 are smaller than the internal space between the two tubes 2 and 3, the sheath 5 is in contact with the tubes 2 and 3 only by means of the tongues 15 and 18.

The shape and flexibility of the tongues 15 and 18 make it possible to absorb the radial forces and to compensate the plays or movements between the two tubes 2 and 3. These tubes can thus slide one into the other with a low axial force, without any sensation of radial play, this play being compensated by the possible deformations of the tongues 15 and 18.

Figure 5:
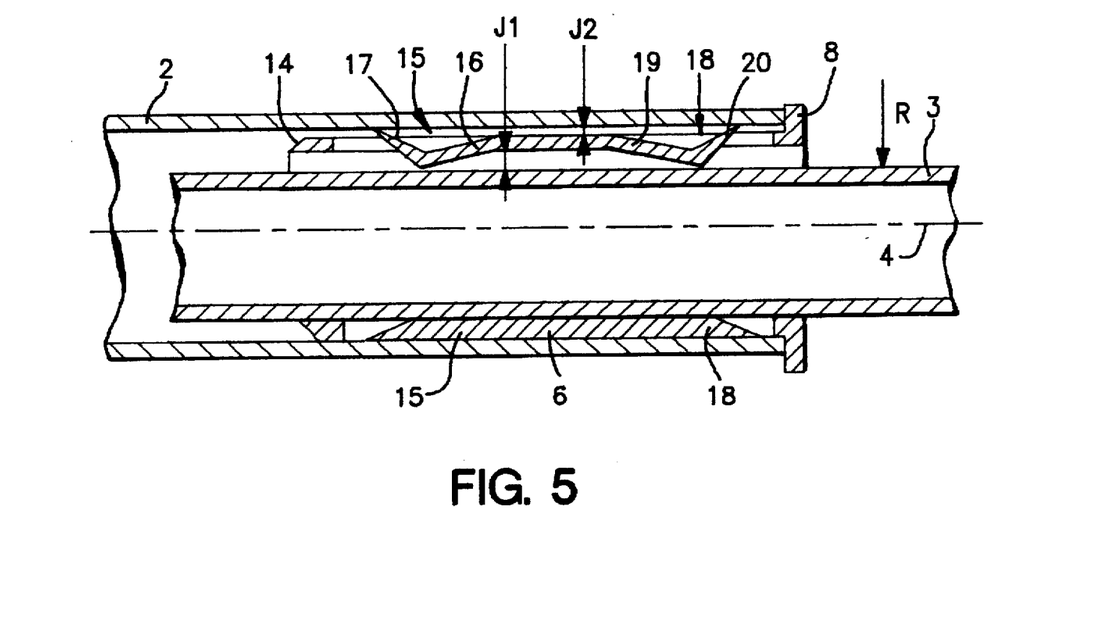
FIG. 5 is an axial section representing the configuration of the sheath when a radial force is exerted on one of the tubes of the tube body.

As shown in FIG. 5, for a radial force R, the latter is firstly compensated by the deformation of the tongues 15 and 18. If the radial force R becomes significant, the tongues bend until the plays J1 and J2 are fully compensated on one side and carried over to the other. It is then the core 6 of the sheath 5 and at least one portion of the branches 16, 19 of the tongues 15, 18 attached to the core 6 of the sheath 5, which are subjected to the entire radial force R.

Figure 6:
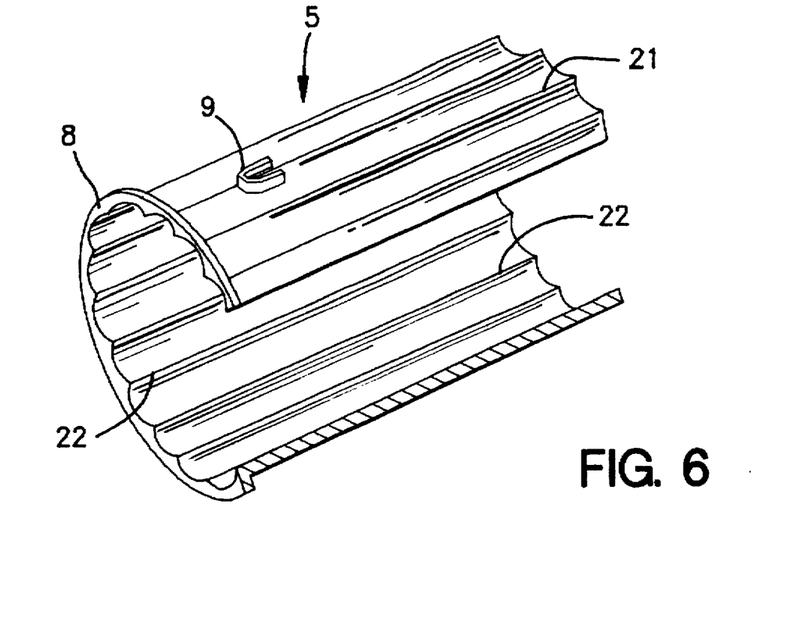
FIG. 6 is a partially cutaway perspective view of another embodiment of a sheath to be disposed between the two tubes of the tube body.

Another embodiment of the sheath 5 is shown in FIGS. 6 and 7.

This sheath 5 includes, as in the preceeding one, various positioning means, especially a flange 8, disposed at one of its extremities and intended to come in abutment with the outer tube, and a block 9.

In this embodiment, the projecting elements 21, 22 are disposed longitudinally on the inner and outer surfaces of the sheath. They are embodied in the form of undulations or ridges.

The contact between the sheath 5 and the two tubes of the tube body is obtained by substantially linear contact surfaces 21, 22, disposed parallel to the axis of the tubes and therefore orientated in the direction of the relative movement between the two tubes at the time of the operation for adjusting the depth of the steering column. This disposition is adapted to limit the effect of wear on the projecting elements.

The length of these linear contacts is sufficient so as to constitute a long centering and thus makes it possible to conceal boxing between the two tubes.

FIG. 7 shows a section where the external projecting elements 21 are connected to the internal projecting elements 22 by a deformable zone 23. This deformable zone 23 provides the projecting elements with their radial flexibility, making it possible to compensate the production dimensional tolerances and dispersions of the tubes 2 and 3. This zone 23 also is adapted to manage the sliding force according to the contact pressures exerted on the projecting elements 21, 22.

The projecting elements 21 and 22 are advantageously disposed regularly on the periphery of the sheath 5.

The invention is not limited to the embodiments described above, but covers all equivalent means and variants. For example, the invention has been described with reference to cylindrical tubes, but is applicable to all shapes of tubes also having an oval, square, rectangular, triangular, pentagonal, or polygonal section and generally speaking any regular or irregular geometrical shape, the important factor here being to have tubular elements adapted to slide into one another. The section of the sheath then needs to be adapted to the shape of the tubes used.

The sheath 5 has been shown in FIGS. 2 to 5 as comprising two sets of tongues 15, 18, but a different number is possible including a single set.

Each set shown in FIGS. 2 to 5 includes four tongues disposed regularly at the periphery of the sheath. The number of tongues of each set may be less than four and in particular equal to three or also greater than four.

The sets of tongues can be radially offset by a certain angle and may even comprise a number of tongues differing from one set to another.

The two sets of tongues have been presented as being disposed symmetrically, but this symmetry is not essential.

The sheath has been represented in embodiments comprising projecting elements which are flexible in a radial direction and come into contact With the two tubes of the tube body.

In another embodiment, the sheath can also be slit in the longitudinal direction. This slit allows for a variation of the diameter and thus an adaptation to one of the two tubes, the dimensional adaptation to the other tube being provided by the radial flexibility of the projecting elements. In this embodiment, the projecting elements advantageously come into contact with the mobile tube, thus allowing for the depth of the column to be adjusted. The mobile tube is generally the inner tube.

The sheath is advantageously made of plastics, in particular of a thermoplastic material, lending itself well to injection moulding and to a production in a single piece.

An antifriction material, such as a plastic material prepared from tetrafluoroethylene of the type commercialized under the name TEFLON (registered trademark) or molybdene disulphide, or even grease or oil, can be added to the constitutive material of the sheath, inside or at the surface thereof. This antifriction material can also be located more precisely at the level of the surfaces of the projecting elements in contact with the tubes 2 and 3.

The tubes 2 and 3 are made from sheet metal, such as steel or aluminium, by means of conventional methods such as drawing, rolling and welding or even rolling followed by welting.

The invention has been illustrated on a steering column, as shown in FIG. 1, which comprises means or units not forming part of the claimed invention, such as an energy absorbing unit for cases of impact, angular adjustment means, and various means for fixing the tube body on the frame or the body of the vehicle.

The invention is of course applicable to any other type of column and the purpose of FIG. 1 is only to show how the invention can be concretely used in a motor vehicle steering column.

The purpose of the reference signs inserted following the technical characteristics mentioned in the claims is only to facilitate the understanding of the latter and does not limit their scope.

We claim:

1. Depth-adjustable steering column, for a motor vehicle, comprising: a shaft disposed in a tube body including two tubes with one inner tube sliding into the other outer tube, and a sheath disposed between the two tubes, said sheath comprising projecting elements which are flexible in a radial direction and come into contact with at least one of the tubes, said projecting elements being orientated longitudinally, and substantially parallel to the axis of the tubes.

2. Steering column according to claim 1, wherein the sheath comprises projecting elements coming into contact with the two tubes.

3. Steering column according to claim 1, wherein the sheath comprises a block adapted to be engaged in an opening formed on one of the tubes so as to keep the sheath in position.

4. Steering column according to claim 1, where in the projecting elements are flexible tongues.

5. Steering column according to claim 1, wherein the sheath includes two sets of flexible tongues, respectively disposed close to the extremities of the sheath.

6. Steering column according to claim 4, wherein each tongue includes a branch slanted with respect to said axis and whose free extremity comes into contact with one of the two tubes.

7. Steering column according to claim 6, wherein the slanted branch of a tongue forms along with said axis an angle of between and 5° and 45°.

8. Steering column according to claim 7, wherein the slanted branch of a tongue forms along with said axis an angle equal to about 15°.

9. Steering column according to claim 4, wherein the sheath comprises a core from which each of the tongues extends, each tongue including two branches, one extremity of the first branch being connected to the core of the sheath and the other extremity being connected to one extremity of the second branch, the other extremity of the second branch being free, said first and second branches being disposed so as to form an open V whose apex comes into contact with one of the tubes, the free extremity of the second branch coming into contact with the other tube.

10. Steering column according to claim 1, wherein the longitudinally orientated projecting elements are embodied by providing the sheath with a generally undulated or ridged section with zones situated at the tops of the undulations or ridges entering into contact with the tubes of the tube body, thereby providing substantially linear contact surfaces disposed parallel to the axis of the tubes, whereas linking zones between the top zones are deformable, producing a radial flexibility.

11. Steering column according to claim 1, wherein the sheath is slit in the longitudinal direction.

12. Steering column according to claim 1, wherein the sheath is made of a thermal plastic material.

13. Steering column according to claim 1, wherein an antifriction material is added to the material constituting the sheath, or inserted between the sheath and the tubes, at least close to the projecting elements.

14. Depth-adjustable steering column, for a motor vehicle, comprising: a shaft disposed in a tube body including two tubes with one inner tube sliding into the other outer tube, and a sheath disposed between the two tubes, said sheath comprising projecting elements which are flexible in a radial direction and come into contact with at least one of the tubes, said projecting elements being orientated longitudinally, and substantially parallel to the axis of the tubes, and said sheath including at one of its extremities a flange abutting a stop against the outer tube at the time of emplacement.

15. Steering column according to claim 14, wherein the sheath comprises projecting elements coming into contact with the two tubes.

16. Steering column according to claim 14, wherein the sheath comprises a block adapted to be engaged in an opening formed on one of the tubes so as to keep the sheath in position.

17. Steering column according to claim 14, wherein the projecting elements are flexible tongues.

18. Steering column according to claim 14, wherein the sheath includes two sets of flexible tongues, respectively disposed close to the extremities of the sheath.

19. Steering column according to claim 17, wherein each tongue includes a branch slanted with respect to said axis and whose free extremity comes into contact with one of the two tubes.

20. Steering column according to claim 19, wherein the slanted branch of a tongue forms along with said axis an angle of between and 5° and 45°.

21. Steering column according to claim 20, wherein the slanted branch of a tongue forms along with said axis an angle equal to about 15°.

22. Steering column according to claim 17, wherein the sheath comprises a core from which each of the tongues extends, each tongue including two branches, one extremity of the first branch being connected to the core of the sheath and the other extremity being connected to one extremity of the second branch, the other extremity of the second branch being free, said first and second branches being disposed so as to form an open V whose apex comes into contact with one of the tubes, the free extremity of the second branch coming into contact with the other tube.

23. Steering column according to claim 14, wherein the longitudinally orientated projecting elements are embodied by providing the sheath with a generally undulated or ridged section with zones situated at the tops of the undulations or ridges entering into contact with the tubes of the tube body, thereby providing substantially linear contact surfaces disposed parallel to the axis of the tubes, whereas linking zones between the top zones are deformable, producing a radial flexibility.

24. Steering column according to claim 14, wherein the sheath is slit in the longitudinal direction.

25. Steering column according to claim 14, wherein the sheath is made of a thermal plastic material.

26. Steering column according to claim 14, wherein an antifriction material is added to the material constituting the sheath, or inserted between the sheath and the tubes, at least close to the projecting elements.

* * * * *